United States Patent
Russell et al.

(10) Patent No.: US 6,738,356 B1
(45) Date of Patent: May 18, 2004

(54) OBJECT ORIENTED VIDEO MERGING SYSTEM

(75) Inventors: Paul Robert Russell, Port Coquitlam (CA); Paul Joseph Geofroy, Burnaby (CA); Wai Ho Wu, Burnaby (CA)

(73) Assignee: Convedia Corporation, Burnaby (CA)

( * ) Notice: Subject to any disclaimer, the term of this patent is extended or adjusted under 35 U.S.C. 154(b) by 815 days.

(21) Appl. No.: 09/635,633

(22) Filed: Aug. 10, 2000

(51) Int. Cl.$^7$ .............................................. H04L 12/16
(52) U.S. Cl. ..................... 370/260; 348/14.08; 709/204
(58) Field of Search ................. 370/260, 261, 370/262, 263, 264, 265, 266, 401, 402, 470, 489, 490, 503, 509, 510, 512, 522, 528, 527, 442, 444, 537, 538, 540; 348/14.08, 14.09, 14.1, 14.11, 14.12, 14.13; 709/204, 205, 207; 725/109, 119

(56) References Cited

U.S. PATENT DOCUMENTS

| | | | |
|---|---|---|---|
| 4,004,084 A | 1/1977 | Brown et al. ............... 348/14.1 |
| 4,160,994 A | 7/1979 | Mendrala ..................... 348/587 |
| 4,684,990 A | 8/1987 | Oxley ......................... 348/585 |
| 4,814,884 A | 3/1989 | Johnson et al. ............. 348/596 |
| 5,187,571 A | 2/1993 | Braun et al. .................. 348/39 |
| 5,400,080 A | 3/1995 | Oka ............................ 348/585 |
| 5,408,272 A | 4/1995 | Barnett et al. .............. 348/585 |
| 5,600,646 A | 2/1997 | Polomski .................... 370/263 |
| 5,657,096 A | 8/1997 | Lukacs ........................ 348/585 |
| 5,737,011 A | 4/1998 | Lukacs ....................... 348/4.09 |
| 5,754,836 A | 5/1998 | Rehl ........................... 309/400 |
| 5,784,561 A | 7/1998 | Bruno et al. ................ 709/204 |
| 5,796,424 A | 8/1998 | Ely et al. .................... 348/14.1 |
| 5,838,664 A | 11/1998 | Polomsk ...................... 370/263 |
| 5,867,653 A | 2/1999 | Aras et al. .................. 709/204 |
| 5,903,673 A | 5/1999 | Wang et al. ................. 382/236 |
| 6,134,223 A * | 10/2000 | Burke et al. ................ 370/265 |
| 6,211,902 B1 * | 4/2001 | Tanoi ......................... 348/14.09 |
| 6,285,661 B1 * | 9/2001 | Zhu et al. .................... 370/260 |
| 6,621,514 B1 * | 9/2003 | Hamilton ................... 348/14.09 |

OTHER PUBLICATIONS

Paper entitled "Continuous Presence" by A.B.Larsen & E.P.Brown (undated).
Paper Entitled "The Personal Presence System . . . " by David B. Boyer & Michael E. Lukacs (undated).
Conference Record From 1978 National Telecommunications Conference, vol. 1, Containing Paper Entitled "A Continuous Presence . . . " by E.F. Brown, J.O.Limb & B.Prasada (Dec. 3–6, 1978).
Paper Entitled "Video Conferencing Systems" by Shaker Sabri & Birendra Prasada (Apr. 1985).
International Switching Symposium 1987 Proceedings Containing Paper Entitled "A Multi–Media Multi–Point . . . " by E.J. Addeo, A.D. Gelman & V.F. Massa (Mar. 17, 1987).
Paper Entitled "Personal Multi–Media Multi–Point . . . " by E.J. Addeo, A.D. Gelman & A.B. Dayao (1988).

(List continued on next page.)

Primary Examiner—Brian Nguyen
(74) Attorney, Agent, or Firm—Marks & Clerk (57) ABSTRACT

In an object oriented video merging system for use in teleconferencing, at least an object from one discrete video stream is to be merged into a composite video output signal for return to a plurality of selected sources at each instant in time, and each object in each video frame is describable by a polynomial which defines a two-dimensional shape. Video processing units processing video data from a plurality of video sources on a frame-by-frame basis, and a backplane having at least a data bus, and a common video bus into which an object from one discrete video stream is merged at any instant in time from a respective video processing unit. Each video processing unit includes an object description generator, a video priority register, and a video selector for permitting an object from the video stream being processed by the respective video processor unit to be transmitted to the common video bus only if the priority of that video stream at any instant in time permits such transmission.

16 Claims, 4 Drawing Sheets

OTHER PUBLICATIONS

Paper Entitled "Video Composition Methods and Their Semantics" by Horng–Darlin & David G. Messerschmitt(1991).

Computer Communication Review, vol. 22, Containing Paper Entitled "Compositing Motion–Compensated Video Within the Network" by Shih–Fu Chang & David G. Messerschmitt.

Paper Entitled "Architectures for Multi–Source Multi–User Video Compositing" by Louis C. Yun & David G. Messershmitt (1993).

Paper Entitled "The Persona Presence System–Hardware Architecture" by Michael E. Lukacs(1994).

Paper Entitled "The Personal Presence System . . . " by David G. Boyer & Michael E. Lukacs (Apr. 1995).

Paper Entitled "A Universal Broadband Multipoint . . . " by Michael E. Lukacs & David G. Boyer(1995).

Paper Entitled "The Personal Presence System . . . " by David G. Boyer & Michael E. Lukacs [Michael Mills, Independent Consultant] (1996).

* cited by examiner

OBJECT ORIENTED VIDEO MERGING SYSTEM

FIELD OF THE INVENTION

The present invention relates to teleconferencing, and particularly relates to a system for video object merging where the merging is in respect of object oriented video data.

BACKGROUND OF THE INVENTION

Video conferencing or teleconferencing is also referred to, more broadly, as multimedia conferencing. Any multimedia conferencing system may utilise a variety of media types and sources, but particularly utilises live or real-time video and audio sources from a plurality of remote users. Those remote users may be geographically scattered very widely, ranging from being located in different areas in the same office building, to different cities, and even to different continents.

The present invention is particularly directed to a system where there is a plurality of video streams to be handled, each from one of a plurality of different sources. No consideration is given as to whether the video streams all comply with the same protocol, it being recognized that varying processing units for various video streams can be arranged so as to accommodate differing protocols.

However, in order for the object oriented video merging system of the present invention to be operative, the video streams must be in synchronism, each comprising active video frames and blanking intervals between each pair of consecutive active video frames, where all of the active video frames have essentially the same finite time span and repetition frequency.

In any teleconferencing circumstance, there will be at least two participants, and usually many participants. Generally, the total number of participants in a particular teleconferencing conference may be dynamically configurable.

In any event, each participant will generate a video flow—a screen of video data which is organized in frames and blanking intervals between the frames, with video data being present in each frame. Other informational data may be present or injected into the data stream in the blanking interval between active video frames, or may be otherwise communicated between the participants.

Indeed, as will be discussed hereafter, the blanking interval between video frames whether it be vertical and/or horizontal blanking—may be divided into a plurality of time slots whereby priority, identification, and other data, can be assigned to each video screen in preselected or designated time slots.

A variety of multimedia conferencing systems are known, a particular one of which is described in Jang et al U.S. Pat. No. 6,442,758. That multimedia conferencing system includes a central processing hub; and the object oriented video merging system of the present invention may be employed in the video encoding and processing portions of that multimedia conferencing system.

The present invention provides an object oriented video merging system, the principal feature of which is that there is provided a backplane having a common medium video bus which provides a centralized medium onto which a plurality of video objects may be merged. Of course, it will be understood that each object is a two-dimensional shape which is contained within any active video frame. As to the shape of the object, it may and generally will vary from frame to frame, and it may be a simple object or it may be very complex shape. As such, the object is, however, describable by polynomials which may be simple polynomials; or it may be that a complex algorithm might be required to describe the two-dimensional shape which is the video object to be merged.

DESCRIPTION OF THE PRIOR ART

Polomski, U.S. Pat. No. 5,600,646, issued Feb. 4, 1997, and its continuation and co-terminous U.S. Pat. No. 5,838,664 each teach a video teleconferencing system where digital transcoding is employed so as to obtain algorithm transcoding, transmission rate matching, and spatial mixing. A multipoint control unit allows multiple terminals to send and receive compressed digital data signals, so as to communicate with each other in a conference. The video processing unit which performs algorithm transcoding, rate matching, and spatial mixing, includes a time division multiplex pixel bus and a plurality of processors. In a receive mode, each processor receives and decodes compressed video signals from its assigned terminal and puts the decoded signal onto the pixel bus. In a transmit mode, each processor receives from the pixel bus uncompressed video signals, which are processed and then coded for transmission to a respective assigned terminal. Video decoding time due to motion displacement search is reduced by passing displacement information from the compressed video signals to the encoder to be used directly, or as seed for further refinements of the motion displacement field.

Two United States Patents issued to Lukacs, U.S. Pat. No. 5,657,096, issued Aug. 12, 1997 and U.S. Pat. No. 5,737,011, issued Apr. 7, 1998, each teach a real time video conferencing system and method where a central multimedia bridge is used to combine multimedia signals from a plurality of conference participants into a single composite signal for each participant. Here, each conference participant is given the ability to customize their own individual display of the other participants, including the ability to key in and out selective portions of the display and overlapping display images, together with the ability to identify individual images in a composed video stream by click and drag operations. A chain of video composing modules is employed, to combine video signal streams from any number of conference participants in real time. Each participant in a conference may dynamically change the right of access of other participants to the information that they provide to the conference.

Bruno et al U.S. Pat. No. 5,784,561, issued Jul. 21, 1998, is concerned with on-demand, real-time video conferencing, and provides a system which includes at least one video control system. That control system received an on-demand request for a video conference from a user and then, in real time, allocates video conferencing resources and connects the user with at least one other video conference participant through a circuit switched communications network. Each user is connected with at least one other video conference participant, based on the number of total participants that there are, the number of video ports which are available in the video conference control system, and the available connection paths in the circuit switched communications network.

Ely et al. U.S. Pat. No. 5,796,424, issued Aug. 18, 1998, describes a system and method for providing video conferencing services where a broadband switch network, a broadband session controller, and a broadband service control point are provided. Here, connections are provided between information senders and receivers in response to instructions from the broadband service control point or in response to requests which are originated by any remote information sender/receiver. The broadband service control point provides processing instructions and/or data to the broadband controller and to each remote sender/receiver. The system is particularly directed to video-on-demand utilization. Whenever a user requires a video from a video information provider, the broadband session controller establishes communication between the set top controller at the remote user's location and the video information provider, requesting processing information from the broadband service control point in response to predetermined triggers. A broadband connection between a video information provider and a specific user is established under control of the broadband session controller. If the system is to be used in video conferencing, the set top controller will control cameras, microphones, and so on. Telephone services may also be provided over the same integrated network.

Aras, et al, U.S. Pat. No. 5,867,653, issued Feb. 2, 1999, teaches a method and apparatus for multi-cast based video conferencing. Here, a multi-cast server sets up a multi-cast over a point-to-multipoint connection, which connects all multi-cast clients along with a primary multi-cast client. The primary multi-cast client is connected to the multi-cast system via a point-to-point link. An arbitrator is established; and when a multi-cast client wishes to speak, a speaking request is sent to the arbitrator who then determines when to grant or deny the speaking request. In each case, there is a video stream which is set up, so that when permission by the arbitrator has been granted to a requesting multi-cast client, that client then provides a new video stream to multi-cast server over a newly established point-to-point connection, and the multi-cast server switches or provides the video stream from that client to the point-to-multipoint connection for the benefit of the other clients.

Wang, et al, U.S. Pat. No. 5,903,673, issued May 11, 1999, teaches a digital video signal encoder and encoding method whereby image quality is maximized without exceeding transmission bandwidth. Here, there is concern about the size of the encoded frames, which may require to be quantized so as to adjust the various encoded frames closer in size to the desired size. If the cumulative bandwidth balance deviates from a predetermined range, quantization is adjusted as needed to improve image quality to more completely consume available bandwidth, or to reduce image quality to thereby consume less bandwidth. Rapid changes are detected, and quantization is precompensated according to the rate of change.

SUMMARY OF THE INVENTION

The present invention provides an object oriented video merging system for use in teleconferencing, where a plurality of video objects are contained within the active video frames of a plurality of video screens from a plurality of different sources, at any instant in time. At least an object from one discrete video screen is to be merged into a composite video output signal for return to a plurality of selected sources at each instant in time. Each object in each video frame is describable by a polynomial which defines a two-dimensional shape.

The system includes a system controller, and a clock means for generating a clock stream. There is a master frame pulse generating means for periodically imposing a master frame pulse on the clock pulse stream.

A plurality of video processing units is provided, each for processing video data from one of a plurality of video sources. The processing of video data is carried out on a frame-by-frame basis.

There is a backplane which has at least a data bus, and a common video bus onto which an object from one discrete video stream is merged at any instant in time from a respective video processing unit communicating with that common video bus.

An object description generator is provided for each video screen which is being processed by each respective video processor. A video priority determinator is found in the system controller, for determining the priority of each video stream at each instant in time.

Video selection means are provided in each video processor unit for permitting an object from the video stream being processed by the respective video processor unit to be transmitted to the common video bus, but only if the priority of that video stream at any instant in time permits such transmission.

In keeping with a particular aspect of the present invention, each video processing unit comprises a video preprocessor, an object description generator, and a video priority register for receiving and storing data received from the system controller relating to the priority of an object contained in a video frame being processed by the respective video processing unit at each instant in time.

There is also a descriptor/video time division multiplexing controller which controls a multiplexer so as to pass either video frame data or object description and video priority data from the video preprocessor or the object description generator and priority register, respectively, at any instant in time. There is also a video selector for collecting relevant data from the backplane so as to determine if the video frame being processed by the respective video processing unit at that instant in time can be released to the common video bus.

In another aspect of the invention, mutually exclusive predetermined time slots are established in the blanking interval between active video frames for each video screen being processed by each respective video processing unit. Those mutually exclusive predetermined time slots are assigned to each respective video processing unit. Thus, the object description for the object in each video frame, as generated by the respective object description generator, is broadcast to all video processing units for detection and handling by the respective video selector in each video processing unit, during the blanking interval.

The predetermined time slots for each respective video processing unit may be under the control of the system controller; or they may hard wired into each respective video unit.

In the present invention, the multiplexer in each respective video processing unit is under the control of the descriptor/video time division multiplexing controller, so as to pass signals from the object description generator to the respective data bus on the backplane, during the blanking intervals between active video frames of the respective video stream being processed by each respective video processing unit.

Of course, only a single video processing unit will pass a video object signal to the common video bus during any active video time slot, and the video object signal having the highest priority at that instant in time when there is an active video time slot is the video object signal which is passed to the common video bus.

The present invention provides that, in some circumstances the master frame pulse generating means may be included in a single designated video processing unit, the selection of which is under the control of the system controller.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
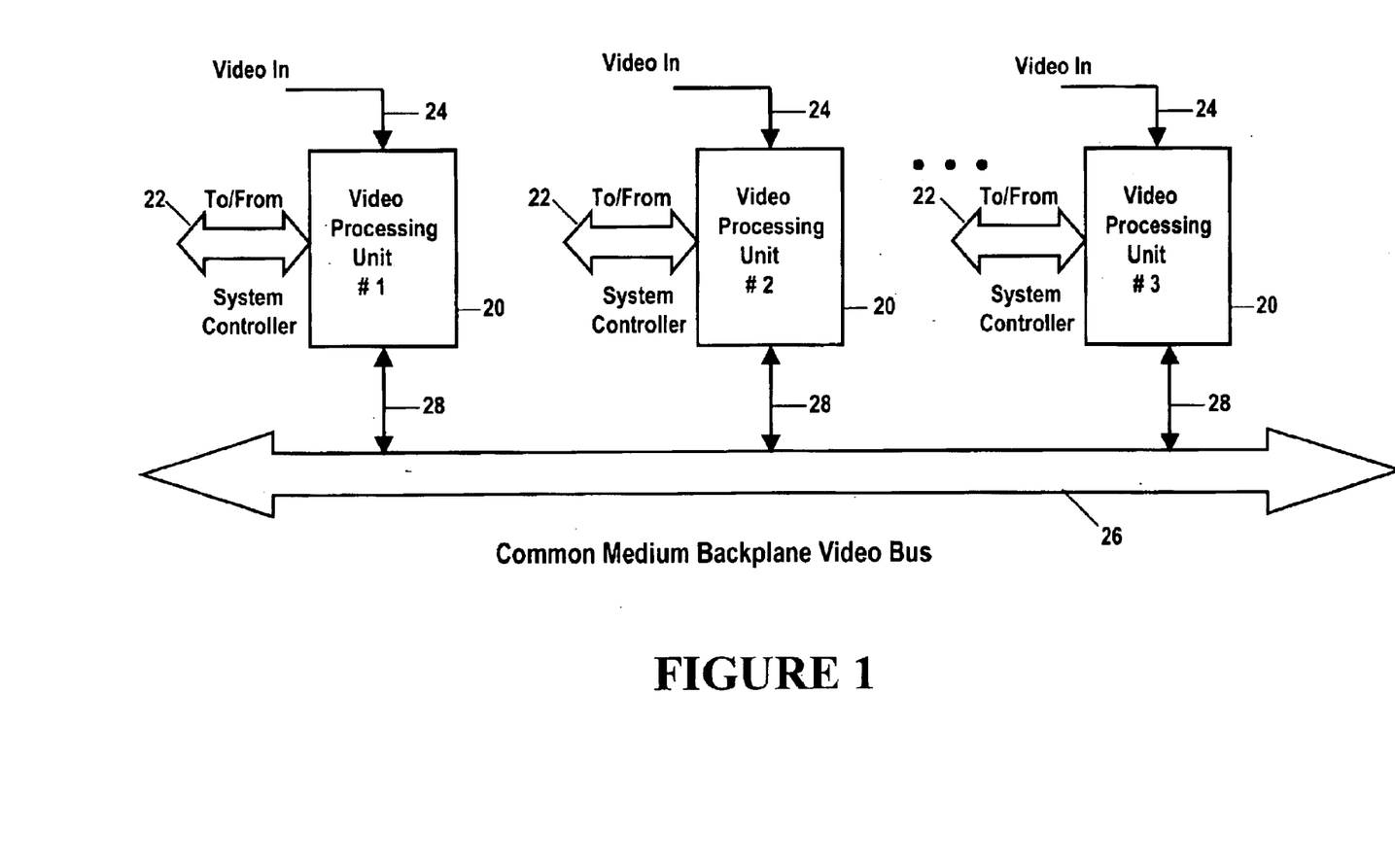
FIG. 1 is a general block diagram schematic showing a video merging system in keeping with the present invention.
Figure 2:
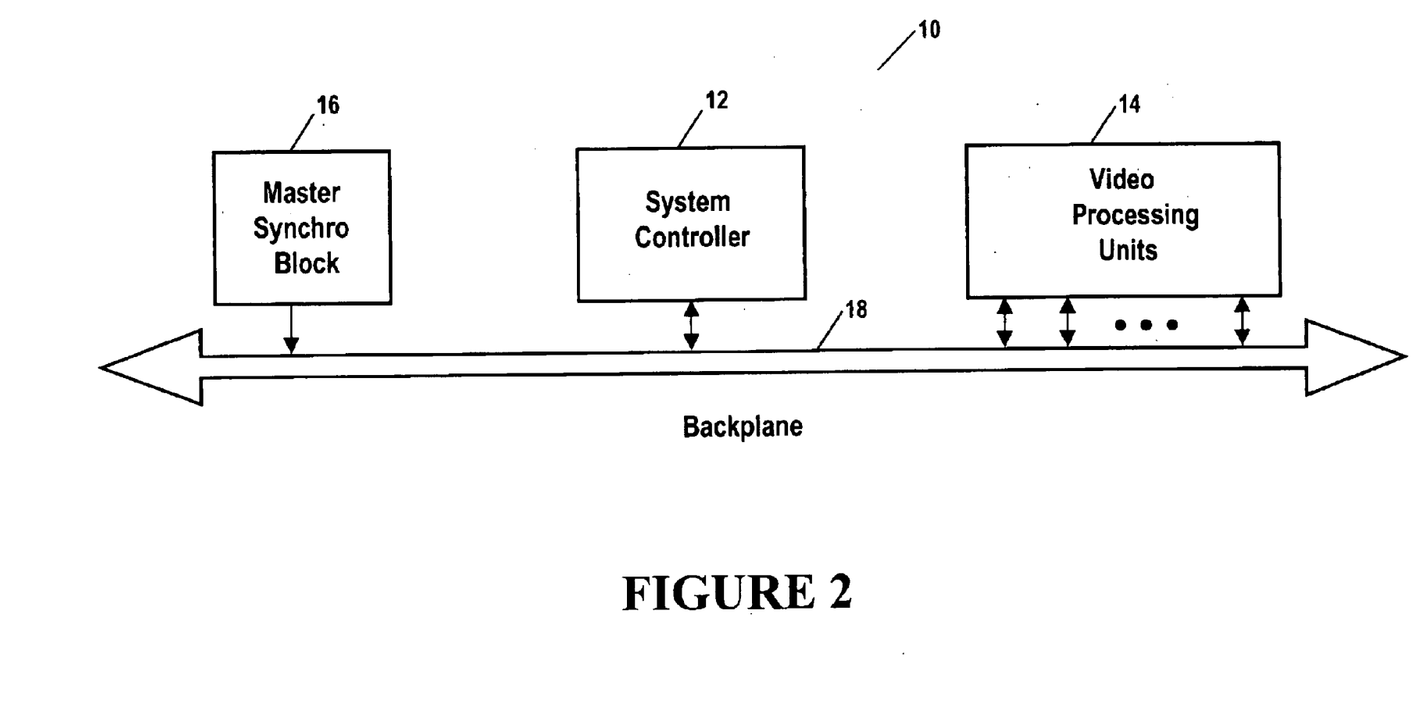
FIG. 2 is a further block diagram schematic showing the principal components of a system in keeping with the present invention.

Referring first to FIG. 2, a general system block diagram is shown for an object oriented video merging system 10 in keeping with the present invention. The system includes a system controller 12 and a plurality, shown at 14, of individual video processing units 20 (see FIG. 1). A master synchronisation block 16 is included in the system in keeping with the present invention, as is a backplane 18. As will be noted hereafter, the backplane 18 has at least a data bus, a clock bus, and a common video bus.

A purpose of the system controller 12 is to send the polynomials which define the objects in each video frame, and the priorities thereof, to each of the video processing units 20. The video processing units 20 then alter the video image to match the polynomials, by scaling, and communicate the polynomials that are to be associated with the next video frame to all of the other video processing units 20. This keeps the video image and the polynomials in synchronization.

FIG. 1 shows a more specific system block diagram, showing a plurality of video processing units 20, each being one of "N" units that are employed in any video merging system in keeping with the present invention. Each video processing unit 20 communicates to and from the system controller 12, as indicated at 22. Each video processing unit 20 has a video input, as shown at 24; and each video processing unit 20 communicates with a common medium backplane video bus 26, as shown at 28.

As noted above, the purpose of the present object oriented video merging system is for use in teleconferencing, where a plurality of video objects are contained within the active video frames of a plurality of video streams from a plurality of different sources. Those video streams arrive in the system of the present invention, at the video inputs 24.

An object from one discrete video stream is to be merged into a composite video output signal for return to a plurality of selected sources at each instance in time, by placing that object onto the common medium backplane video bus 26. As noted, each object in each video frame is describable by a polynomial which defines a two-dimensional shape.

Figure 3:
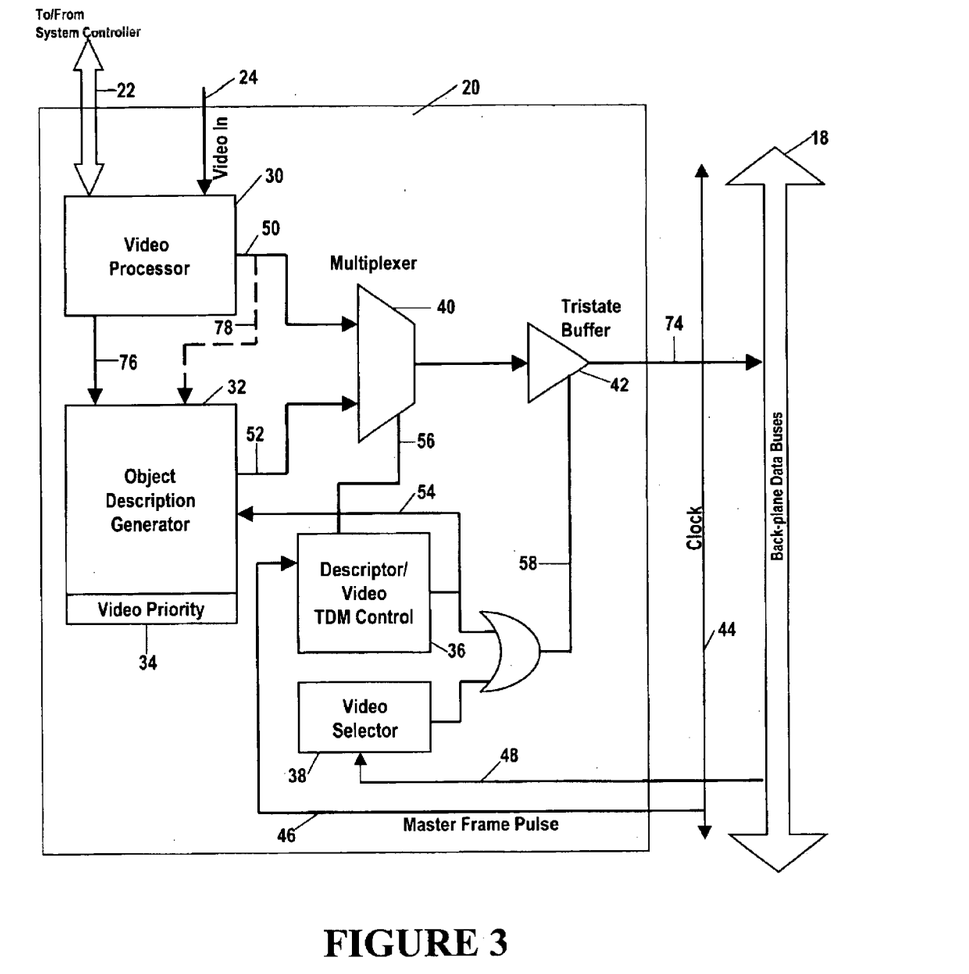
FIG. 3 is a block diagram of a processing unit in keeping with the present invention.

Obviously, and as noted hereafter with respect to FIG. 3, a clock is required for generating a clock pulse stream. Moreover, a master frame pulse generating means 16 is required for periodically imposing a master frame pulse on the clock pulse stream. Thus, synchronisation of video frames in each processing unit 20 is accomplished.

The backplane 18 is shown generally in FIG. 2, but examination of FIG. 2 will reveal that the backplane 18 will have therein at least a data bus for carrying data to and from the system controller and the various processing units identified as populating block 14. Obviously, a clock bus is provided along which a clock pulse stream is fed to every component of the system, and onto which there is a master frame pulse which is periodically imposed by the master synchronisation block 16. Moreover, the backplane 18 will carry a common video bus 26, onto which an object from any one discrete video stream is merged from the respective processing unit 20, at any instant in time, in keeping with the teachings of the present invention.

Quite unexpectedly, the inventors herein have discovered that by providing a centralized medium, that is by providing the common medium backplane video bus 26, for merging "N" video objects, where each object is a two-dimensional shape which is contained within an active video frame and which may be described by a polynomial, then object oriented video merging is easily accomplished. The invention provides certain aspects thereof whereby clashing, or collision, of data is precluded, and whereby a significant number of processing units and therefore a significant number of video streams, can be accommodated at any one time.

This is accomplished because, as noted above, at each instant in time each video processing unit 20 has complete synchronized information about the merging process, and that information is the same for all of the video processing units 20. Thus, since each video processing unit 20 has identical information, and runs the same processing algorithm, there will be no clashing or collision when the video data are merged.

Each frame of video is started by the master frame pulse which comes from the master synchronisation block 16. Thus, all video frames in each of the processing units 20 are synchronised one with another.

Then, each pulse cycle which follows the master synchronisation or master frame pulse, represents a time slot which carries either active video data or blanking interval data, as will be seen later with reference to FIG. 4.

Each video processing unit 20 will feed video data onto the common medium backplane video bus 26, and onto the data bus on the backplane 18, in a particular set of time slots based on information which is known to all of the video processing units 20. The criteria for determining when each processing unit will output video onto the common medium backplane video bus 26 are distributed to each video processing unit 20 via the backplane 18, and acted upon in the manner described hereafter.

Referring to FIG. 3, a block diagram of a typical video processing unit 20 in keeping with the present invention is shown. Each video processing unit 20 will embed information describing the objects from its respective video screen into predetermined time slots of the blanking interval prior to each active video frame, so that that information is available for all other video processing units 20 to read.

The predetermined time slots can be either under the control of the system controller 12, or they may be hard wired.

Figure 4:
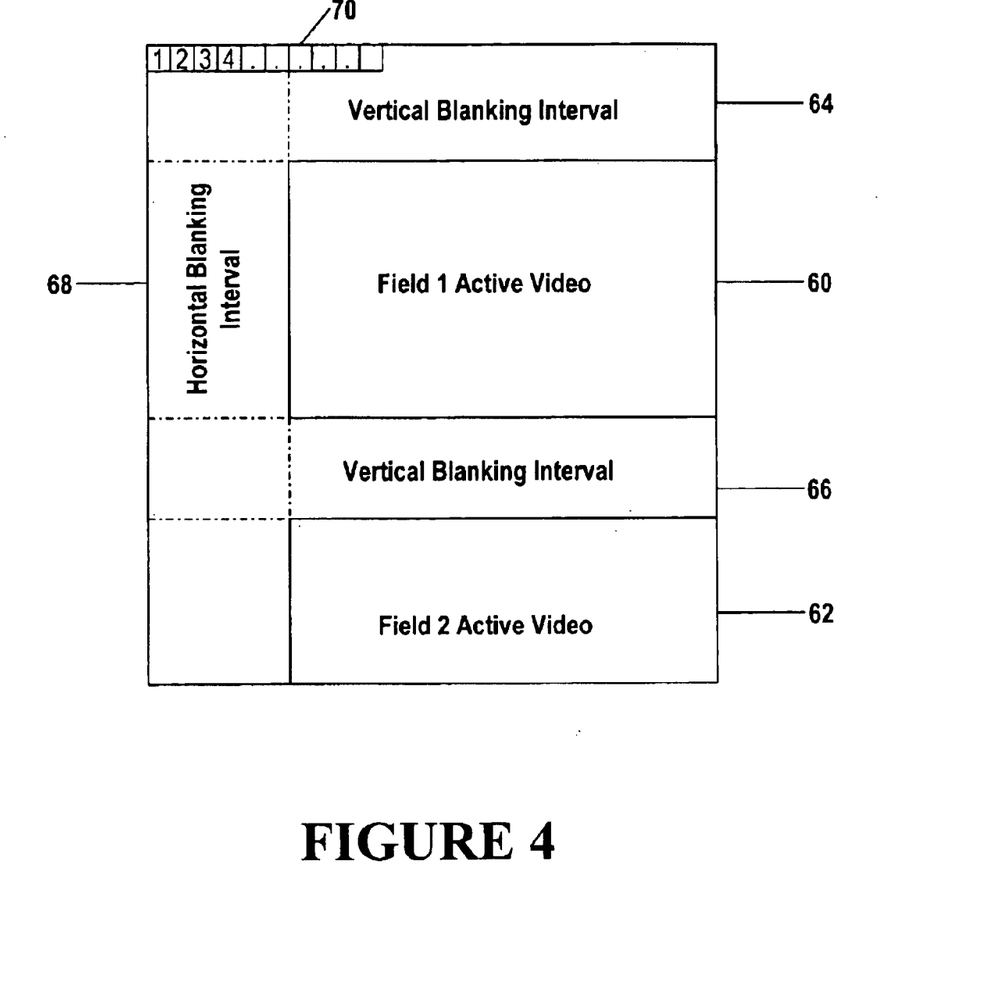
FIG. 4 illustrates the video format for a frame of video.

Turning briefly to FIG. 4, the video format for a typical frame of video in a video stream is shown. Typically, video format of a video stream includes a couple of fields of active video 60 and 62, preceded and separated by vertical blanking intervals 64 and 66. There is also a horizontal blanking interval 68 which forms a portion of the blanking interval between active video frames. Of particular interest is the plurality of time slots 70, which are predetermined.

Each video processing unit 20 is assigned its own specific time slots 70, during which time it will put out its descriptions of its video objects during the vertical and/or horizontal blanking intervals 64, 66, or 68.

For example if each video processing unit 20 is given its own predetermined time slots 70, and each vertical blanking interval 64, or 66, has 34,320 time slots, then in keeping with the present invention, the system can accommodate up to 429 processing units 20 on a single common medium backplane video bus 26.

In keeping with criteria which are outside the scope of the present invention, the system controller 12 will assign a unique priority to each object in the system. That means, the system controller 12 will assign a unique priority on a frame-by-frame basis to each specific video stream, so that the video object within each active video frame is prioritized at any instant in time. Thus, when there are a plurality of video objects in the perspective active video frames of the respective video frames, at instant in time, the video object which has the highest priority is the one which will have its data placed on the common medium backplane video bus 26 which is included in the backplane 18. Therefore, for a particular active video time slot in a frame, each video processing unit 20 decides whether it can output video to the common medium video bus 26; but only one such video processing unit 20 can make that decision based on being that processing unit which has the highest unique priority assigned to the video stream being processed by it.

Turning now to FIG. 3, each video processing unit 20 includes a video processor 30, an object description generator 32, a video priority register 34, a descriptor/video time division multiplexer controller 36, and a video selector 38. There is also provided a multiplexer 40 and a tristate buffer 42.

In the broadest sense, the object description generator 32 functions to provide a polynomial so as to define a two-dimensional shape or object for each video frame of the video stream being processed.

There is a video priority determinator (not shown) included in the system controller 12, whose purpose is to determine the priority of each video stream at each instant in time. Put in other words, the purpose of the video priority determinator is to assign a priority to the video object in each respective video frame of each respective video stream, where the priority is a unique value in each instance.

The video selector 38 then permits an object from the video stream being processed by the respective video processor unit to be transmitted to the backplane 18 and the common medium video bus 26 contained therein over line 74, but only if the priority of that video stream at any instant in time permits such transmission. That is accomplished, in broad terms, by the video selector 38 determining the priority of the video stream which is input at 24 to the video processing unit 20, on the basis of the object description which has been transmitted to it by the object description generator 32, the video priority value being transmitted as at 22.

More particularly, the video processor 30 manipulates each input video 24 and provides a full screen of active video data to the multiplexer 40 even if there is only a portion of the full stream of active video which is desired to be shown.

The object description generator 32 functions, as it were, between video frames. It first receives the video priority and description of the object from the system controller 12, but it generates a set of information which includes the object priority for the next frame of video from the video preprocessor 30. The object description generator 32 will generate an object description for the next incoming frame.

The descriptor/video time division multiplexing controller 36 functions so as to switch the multiplexer 40 over line 56, so that the object description generator 32 will communicate through the multiplexer 40 on line 52 during the blanking intervals of the frame. Of course, during the active video time slot 60, or 62, the time division multiplexing controller controls the multiplexer over line 56 so that video data from the video preprocessor 30 is transmitted over line 50 to the multiplexer 40.

Of course, the video preprocessor 30 must present an image on line 50 that is scaled to match the polynomials in the object description generation 32. To accomplish this, the polynomials may be sent, without video data, from the video preprocessor 30 to the object description generator 32 over line 76. Alternatively, the polynomials may be embedded in blanking interval 64, 66, or 68, and transmitted to the object description generator 32 together with the video data over the line 78; it being understood that either line 76 or line 78 may be used, but not both.

Moreover, the descriptor/video time division multiplexing controller 36 will activate the tristate buffer 42 to drive data onto the backplane 18, only during the predetermined time slot 70 for the specific processing unit 20. It will, at the same time, enable the object description generator 32 to output its description of the object as a polynomial describing a two-dimensional shape, as noted above. That description will have already been transmitted over line 52 to the multiplexer 40.

The purpose of the video selector 38 is particularly to listen to the backplane 18 and to collect over line 48 all description values for each upcoming active video time slot, from all video processing units 20. Each respective video selector 38 then uses those description values to determine whether or not it can output active video data to the common medium backplane video bus 26, during each subsequent active video time slot 60, or 62.

Thus, the descriptor/video time division multiplexing controller 36 controls the multiplexer 40 to pass either video frame data or object description and video priority data from the respective video preprocessor 30 or the object description generator and priority register 32, 34, at any instant in time. The video selector 38 functions to collect data from the backplane 18 to determine if the video frame being processed by the respective video processing unit at that instant in time can be released to the common video bus 26.

Since each video processing unit 20 is assigned specific time slots 70, which are unique to that video processing unit, the specific assigned time slots—all of which are in synchronism as a consequence of the operation of the master synchronisation block 16—function in some respects as an identification tag. Thus, all video selectors 38 will come to the same conclusion at the same time regarding ownership of a particular time slot, and clashing or collision is therefore precluded.

Accordingly, it is seen that the predetermined time slots are mutually exclusive one from another, within the blanking interval between active video frames for each video stream being processed by each respective video processing unit. Thus, the object description for the object in each video frame, as generated by the respective object description generator, is broadcast to all video processing units for detection and handling by the respective video selector 38 in each video processing unit 20 during the blanking interval.

The multiplexer 40 in each respective video processing unit 20 is under control of the descriptor/video time division multiplexing controller 36 in that respective video processor 20, so as to pass signals from the object description generator 32 to the respective data bus on the backplane 18, only during the blanking intervals between active video frames of the respective video streams being processed by each respective video processing unit.

It follows from the above that objects only reside within active time slots; and conversely, predetermined time slots for object descriptors only reside in blanking intervals. Thus, the descriptor/video time division multiplexing controller 36 and the video selector 38 are enabled to work quite independently of each other.

The present invention also contemplates that the master frame host generating means or master synchronisation block 16 may be included in any single designated video processing unit 20, the selection of which is under the control of the controller 12.

There has been described an object oriented video merging system for use in teleconferencing, whereby video objects may be merged to a centralized or common medium—a common medium backplane video bus—and where the priority as to which video object from which video stream is to be passed to the video bus at any instant in time is determined by the system controller. Collisions between video stream and the video objects therefrom being delivered to the video bus are precluded.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An object oriented video merging system for use in teleconferencing, where a plurality of video objects are contained within the active video frames of a plurality of video stream from a plurality of different sources, at any instant in time, where at least an object from one discrete video stream is to be merged into a composite video output signal for return to a plurality of selected sources at each instant in time, and where each object in each video frame is describable by polynomials which define two-dimensional shapes; said system comprising:

a system controller;

clock means for generating a clock pulse stream;

a plurality of video processing units for periodically processing video data from a plurality of video sources;

frame synchronization means for ensuring synchronization of video frames in each said video processing unit;

a common video bus into which an object from one discrete video stream is merged at any instant in time from a respective video processing unit communicating therewith;

an object description generator for each video stream being processing by each respective video processor;

a video priority determinator in said system controller for determining the priority of each video stream at each instant in time;

video selector means in each video processing unit for permitting an object from the video stream being processed by the respective video processing unit to be transmitted to said common video bus only if the priority of that video stream at any instant in time permits such transmission.

2. The object oriented video merging system of claim 1, wherein said fine synchronization means comprises a master frame pulse generating means for periodically imposing a master frame pulse on said clock pulse stream.

3. The object oriented video merging system of claim 2, wherein said video data is processed by said plurality of video processing units on a fame-by-frame basis.

4. The object oriented video merging system of claim 2, further comprising a backplane having at least a data bus and said common video bus.

5. The object oriented video merging system of claim 4, wherein mutually exclusive predetermined time slots in the blanking interval between active video frames for each video stream being processed by each respective video processing unit are assigned to each respective video processing unit, whereby the object description for the object in each video frame, as generated by the respective object description generator, is broadcast to all video processing units for detection and handling by the respective video selector in each video processing unit during the blanking interval.

6. The object oriented video merging system of claim 5, wherein said predetermined time slots for each respective video processing unit are under the control of said system controller.

7. The object oriented video merging system of claim 5, wherein said predetermined time slots for each respective video processing unit are hard wired into each respective video processing unit.

8. The object oriented video merging system of claim 4, wherein only a single video processor unit will pass a video object signal to the common video bus during any active video time slot, and wherein the video object signal having the highest priority at that instant in time when there is an active video time slot is the video object signal which is passed to the common video bus.

9. The object oriented video merging system of claim 4, wherein said master frame pulse generating means is included in a single designated video processing unit, the selection of which is under the control of said system controller.

10. An object oriented video merging system for use in teleconferencing, where a plurality of video objects are contained within the active video frames of a plurality of video stream from a plurality of different sources, at any instant in time, where at least an object from one discrete video stream is to be merged into a composite video output signal at each instant in time; and where each object in each video frame is describable by polynomials which define two-dimensional shapes; said system comprising:

system controller;

a pulse generator for generating a master name pulse;

a clock for generating a stream of clock pulses, over one of which the master frame pulse is periodically imposed;

a plurality of video processing units for processing video data from a plurality of video sources on a video frame by video frame basis; and a backplane comprising at least a data bus, a clock bus, and a common video bus with which each of said plurality of video processing units communicates;

wherein each said video processing unit comprises a video processor, an object description generator; a video priority register for receiving and storing data received from said system controller for priority of an object contained in a video frame being processed by the respective video processing unit at each instant in time; a descriptor/video time division multiplexing controller for controlling a multiplexer to pass either video frame data or object description and video priority data from the video processor or the object description generator and priority register respectively, at any instant in time, and a video selector for collecting data from the backplane to determine if the video frame being processed by the respective video processing unit at that instant in time can be released to the common video bus.

11. The object oriented video merging system of claim 10, wherein mutually exclusive predetermined time slots in the blanking interval between active video frames for each video stream being processed by each respective video processing unit are assigned to each respective video processing unit, whereby the object description for the object in each video frame, as generated by the respective object description generator, is broadcast to all video processing units for detection and handling by the respective video selector in each video processing unit during the blanking interval.

12. The object oriented video merging system of claim 11, wherein the predetermined time slots for each respective video processing unit are under the control of said system controller.

13. The object oriented video merging system of claim 11, wherein the predetermined time slots for each respective video processing unit are hard wired into each respective video processing unit.

14. The object oriented video merging system of claim 10, wherein the multiplexer in each respective video processing unit is under the control of the descriptor/video time division multiplexing controller so as to pass signals from the object description generator to the respective data bus on the backplane, during the blanking intervals between active video frames of the respective video stream being processed by each respective video processing unit.

15. The object oriented video merging system of claim 10, wherein only a single video processing unit will pass a video object signal to the common video bus during any active video time slot, and wherein the video object signal having the highest priority at that instant in time when there is an active video time slot is the video object signal which is passed to the common video bus.

16. The object oriented video merging system of claim 10, wherein said pulse generator is included in a single designated video processing unit, the selection of which is under the control of said system controller.

* * * * *